Figure 1:
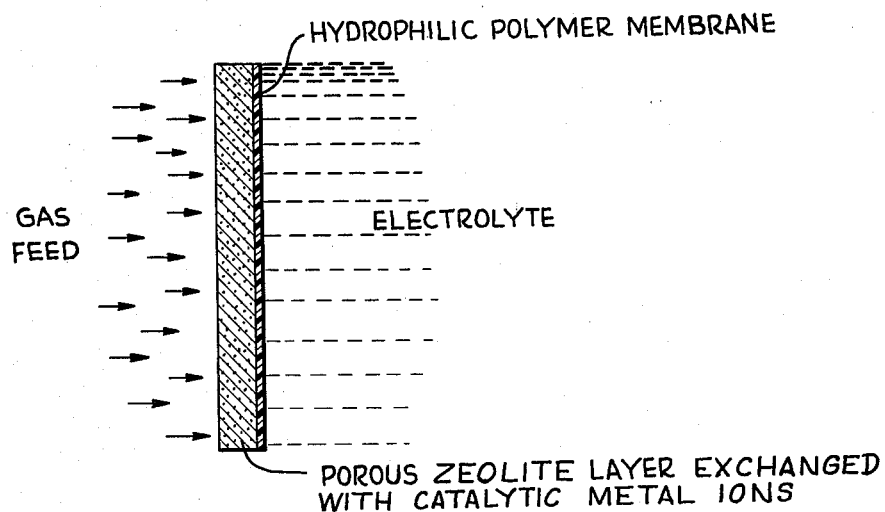

July 9, 1963   A. M. MOOS   3,097,116
FUEL CELL ELECTRODES

Filed Dec. 15, 1960   2 Sheets-Sheet 1

ANTHONY M. MOOS
INVENTOR

BY Watson, Cole, Grindle & Watson
ATTORNEYS

July 9, 1963  A. M. MOOS  3,097,116
FUEL CELL ELECTRODES
Filed Dec. 15, 1960  2 Sheets-Sheet 2

ANTHONY M. MOOS
INVENTOR

BY Watson, Cole, Grindle & Watson
ATTORNEYS

United States Patent Office 3,097,116
Patented July 9, 1963

3,097,116
FUEL CELL ELECTRODES
Anthony M. Moos, Ossining, N.Y., assignor to Leesona Corporation, Cranston, R.I., a corporation of Massachusetts
Filed Dec. 15, 1960, Ser. No. 75,921
8 Claims. (Cl. 136—120)

This invention relates to improved fuel cell electrodes and to their method of manufacture. More particularly, the invention relates to electrodes constructed from natural and synthetic zeolites in combination with a thin polymer layer. These electrodes possess a high degree of catalytic activity and are amenable to the fabrication of a variety of electrode structures.

In the prior art, fuel cell electrodes have generally consisted of macro-porous structures (pore sizes ranging from 1 to 100 microns) which are electrically conducting and electrochemically active. These electrodes, in a fuel cell system, permit the establishment of a three-phase interface of gas, the solid active electrode, and the ionic electrolyte either by a difference in the structure, such as the use of a dual porosity layer or by contacting the electrode interface with a matrix retaining the electrolyte. At the interface a process of adsorption and de-adsorption occurs, producing ions and an electrical charge. The electrical charge is drained from the electrodes, through an external circuit and the fuel ions react with the oxidizing ions to form a neutral product.

Another type of electrode utilized in fuel cells consists of an electrically conducting metallic or metal oxide solid diffusion barrier. These electrodes diffuse and activate the reacting gases, as, for example, a silver-palladium alloy membrane can be employed as a hydrogen diffusion electrode. The hydrogen ions are diffused through the membrane into the electrolyte where they react with ions from the oxidizing gas side and, as in the earlier described electrode, the electrical charge is drained off through an external route.

In the prior art fuel cell systems using macroporous electrode structures, it is necessary to carefully regulate the three-phase interface of solid, gas and electrolyte by a suitable combination of pore size, pressure differential of the gas, and surface tension of the electrolyte. As a practical matter, however, it is impossible to maintain completely uniform pore size, thus the cell is usually operated with the smaller cells flooded with electrolyte due to capillary action or gas is bubbled through the larger pores unusued. The advent of the bi-porous electrode structures, where large pores front the gas of the fuel cell system and smaller pores face the electrolyte, eliminated much of the problem. However, bi-porous electrodes were not the complete answer due to difficulty in uniform fabrication and water formation within the structure. Therefore, solid-diffusion barrier electrodes were investigated and found to be extremely effective as the fuel electrode. However, solid-diffusion barrier electrodes have been largely unavailable which are suitable as both the oxidizing and fuel gas electrodes of the fuel cell. In addition, the solid-diffusion fuel electrodes, such as palladium-silver alloy membranes, are relatively expensive to produce and are only operable with hydrogen fuel.

Accordingly, it is an object of the present invention to provide a solid-diffusion type electrode which can be fabricated for use at either the fuel gas side or the oxidizing gas side of the fuel cell.

It is another object of the invention to provide solid-diffusion type electrodes which are hydrophilic.

It is another object of the invention to provide solid-diffusion type electrodes which are hydrophobic.

It is still another object of the invention to provide solid-diffusion type electrodes which are relatively inexpensive to manufacture and which can be employed with a wide variety of fuel and oxidizing gases.

These and other objects of the invention will become more apparent from the following detailed description.

Briefly, the objects of the instant invention are accomplished by constructing solid-diffusion type electrodes from hydrophilic or hydrophobic polymers, such as porous polyethylene, porous polyurethane foams, polystyrene, cellophane, etc., which are uniformly coated with an ion-exchanged natural or synthetic zeolite powder. In the instant ion-exchanged zeolites the naturally occurring ions are replaced with catalytic metal ions, as, for example, a metal belonging to group 8 of the periodic table. Alternatively, in place of coating the polymer layer, the zeolite powders can be pressed or bonded into a suitable structure and one or several layers of polymer film applied to one surface of the zeolite structure to act as a diffusion barrier. As will be apparent from the following description, that while for simplicity the instant structures are referred to as solid-diffusion type electrodes, it may be that the polymer films actually contain minute pores, and, thus, are not true solid-diffusion electrodes as are silver-palladium alloy membranes.

Figure 2:
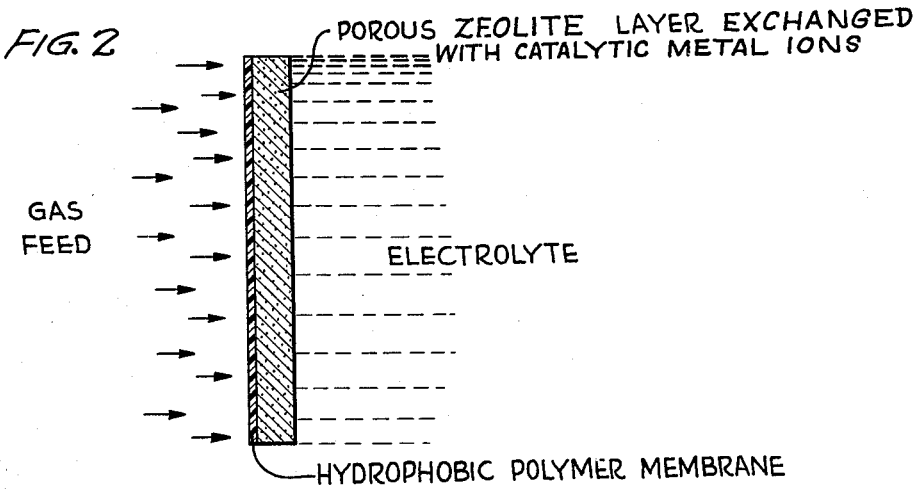

In the drawing, FIGURES 1 and 2 illustrate cross sections of the novel electrodes in a fuel cell system.

Figure 3:
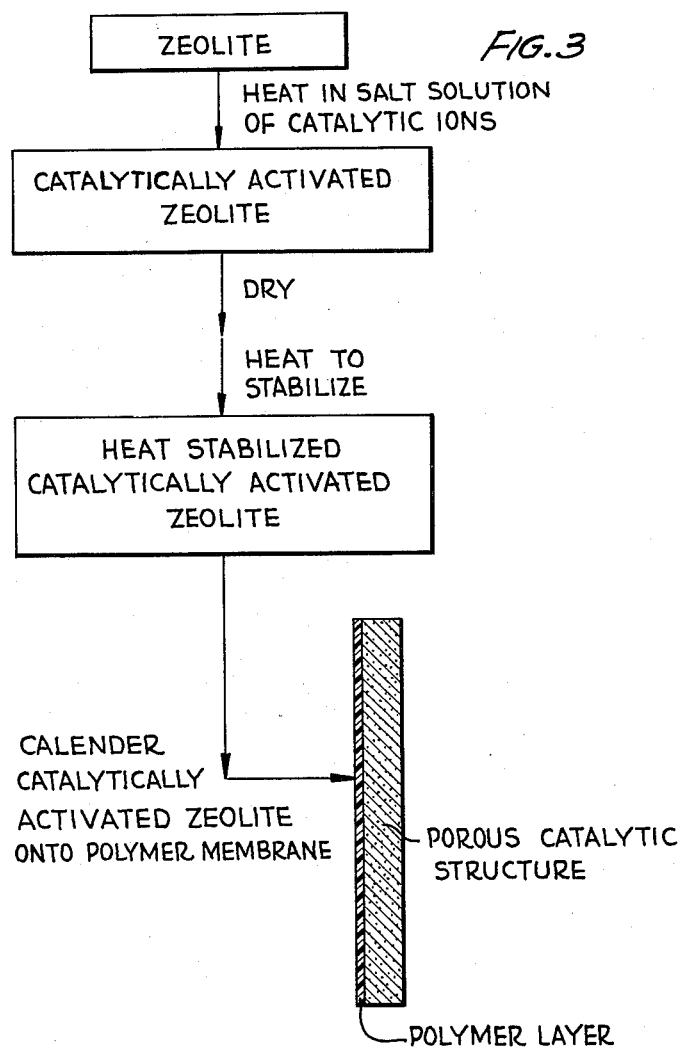

FIGURE 3 is a flow diagram of the process employed in preparing the catalytic electrode structure.

More specifically, FIGURE 1 illustrates an electrode structure with a hydrophilic polymer layer bonded to a substantially solid diffusion barrier catalytic structure. The hydrophilic polymer membrane fronts the electrolyte in the fuel cell and the solid catalytic structure faces the gas feed. Thus, an interface is established of materials having different surface properties, i.e., the electrolyte faces a hydrophilic surface, whereas the gas fronts a substantially solid catalytic surface. FIGURE 2 demonstrates a similar type system except the catalytic structure is calendered to a hydrophobic polymer which fronts the gas feed. FIGURE 3 sets forth a flow sheet of one process of preparing the instant electrodes.

The term "zeolite," as used hereinafter in the specification and claims, includes both the natural and synthetic materials. The natural zeolites are hydrous silicates of aluminum which ordinarily contain sodium or calcium ions, have ion exchange properties, large surface area and a homogeneous and finite porosity. Synthetic zeolites are available from a number of manufacturers and have been described in U.S. Patents Nos. 2,818,137 and 2,818,455. The synthetic zeolites are highly porous materials and, in contrast to other adsorbents, have pores which are of molecular dimensions and uniform size. The synthetic zeolites, in addition to the above patents, are described in the Journal of the American Chemical Society, 78, 5963 (1956) in an article entitled "Crystalline Zeolites."

The zeolites which are used in the instant solid-diffusion type electrodes have open lattice structures with homogeneous pore sizes ranging from 3–20 angstroms. The size of the opening or the pore diameter can be varied according to the elemental composition of the crystal. The composition of one typical synthetic zeolite having a pore size of about 3 angstroms is $K_2O \cdot Al_2O_3 \cdot (SiO_2)_2$. Another zeolite having a pore size of about 4 angstroms is $Na_2O \cdot Al_2O_3 \cdot (SiO_2)_2$. These are prepared by heating, under pressure, essentially stoichiometric quantities of alumina or silica with excess caustic. The excess caustic is washed out to produce the hydrous gel. The solid material is then activated by partial dehydration. The sodium, calcium, and lithium ions present in the materials can be ion-exchanged with concentrated salt solutions of other catalytic metallic ions, such as nickel, silver, cobalt, copper, palladium, platinum and ruthenium. The ion exchange properties of the catalyzed zeolites can be destroyed without appreciably affecting their catalytic properties and pore size distribution by heating at temperatures in excess of 600° C., preferably in the range of 600–1600° C.

These zeolites which have been activated and heat stabilized possess a number of properties which make them suitable as solid-diffusion type electrodes for use at either the cathode or anode of a fuel cell system, depending upon the metal used in the exchange process. The molecular dimension of the structure permits gases to diffuse but prevents liquid electrolyte from penetrating or flooding the electrode. The catalytic sites which have been introduced into the zeolite lattices act as activators and/or electron donors or acceptors for the anodic or cathodic gases and liquids.

In the preparation of solid-diffusion type electrodes, the activated zeolites are used to coat a hydrophilic or hydrophobic polymer membrane which permits ions of the fuel and oxidant to diffuse into the electrolyte, but which prevents electrolyte from flowing in and flooding the electrodes. Alternatively, a zeolite structure can be constructed and one or more layers of polymer applied. Suitable polymers are exemplified by cellophane, polyurethane foam, porous polyethylene, asbestos paper, polystyrene, Teflon, porous polyvinyl chloride, etc. Any polymeric plastic material can be employed, either hydrophilic or hydrophobic, that is capable of acting as a gas diffusion barrier.

The naturally occurring ions of the zeolites used in preparing the instant electrodes are exchanged with catalytic ions, as, for example, a metal from periodic group 8, by known ion-exchange techniques. One illustrative method is to heat the zeolite in a salt solution of the catalytic ions. Time and temperature of the exchange step are, to a large extent, relative and thus not critical. As is well known, an increase of temperature almost invariably increases the rate of reaction to a marked extent. Thus, for homogeneous processes the specific rate is usually increased by a factor of 2 or 3 for every 10° C. rise of temperature. The selection of the time and temperature of the immersion is thus dependent upon the concentration of the solution and the amount of the material or the extent of exchanging of ions which is desired.

After the naturally occurring ions of the zeolite have been exchanged with the catalytic ions and stabilized by heating, a polymer membrane is coated with the activated zeolite as, for example, by spreading the material on one surface and pressing under dielectric heat, or by some other suitable technique.

Another method of constructing the solid-diffusion type electrodes of the instant invention comprises mixing a small proportion of a binding agent, such as fire clay or bentonite, with the catalytically activated zeolite in the presence of water and shaping the admixture as an electrode. The electrode is fired at an elevated temperature before coating one surface with one or more layers of a liquid polymer solution. The cured polymers adhere firmly to the structure and serve as a diffusion barrier.

The electrodes of the instant invention can be employed in fuel cells using virtually any of the prior art electrolytes. As is well known, for an efficient fuel cell it is necessary that the electrolyte remain invariant and have a high ionic conductivity. The alkaline electrolytes, such as sodium hydroxide, potassium hydroxide and the alkanolamines, are particularly desirable. However, acid electrolytes, such as sulfuric acid, phosphoric acid, etc., may be employed. An outstanding feature of the electrodes of the instant invention is that the formation of water occurs only in the electrolyte and not in the electrode structure. Thus, the water does not affect the diffusion process and can be conveniently removed from the electrolyte by suitable means.

In fuel cells utilizing the instant electrodes, fuel such as hydrogen, carbon monoxide, methane, methanol, propane and kerosene vapors have been found to be particularly advantageous. By proper selection of the pore diameter of the zeolite as well as the polymer barrier, the electrode can be tailored to fulfill the requirements of any particular fuel.

The instant diffusion electrodes can be utilized in fuel cell systems operating in a wide temperature range. However, for good diffusion it is desirable that the temperature of the system be in excess of 40° C. and preferably in the neighborhood of 100–250° C. Usually, the instant electrodes are not operated at temperatures above about 700° C. and, although the instant diffusion type electrodes can be operated at lower temperatures, the behavior at such temperatures is somewhat erratic.

The thickness of the zeolite portion of the electrodes as well as the diffusion barrier membrane depends, to a large extent, upon the pressure differential to be applied across the membrane and upon the rapidity of diffusion desired. For example, the diffusion of hydrogen gas through a membrane is proportional to the pressure differential across the membrane and the membrane's thickness. The minimum thickness is immaterial so long as the electrode is structurally able to withstand the necessary pressure of the fuel cell. The preferred range of thickness is from approximately 0.5 mm. to 30 mm. The electrodes can be fabricated as flat, unsupported sheets or they may be formed as a corrugated or tubular structure. The tubular construction is sometimes preferred since the effective surface area of the electrode is increased and is ideal for bipolar or multipolar cells. Additionally, a tubular structure will withstand greater pressures.

Having described the invention in general terms, the following examples are set forth to more particularly illustrate the invention. However, they are not meant to be limiting. Parts are parts-by-weight unless otherwise specified.

*Example 1*

A solid barrier diffusion electrode, particularly suitable as a cathode, is prepared by interchanging the sodium ions of a synthetic zeolite having a pore size of about 4 angstroms, and the formula $Na_2O \cdot Al_2O_3 \cdot (SiO_2)_2$ with silver ions by immersing the zeolite in a 20% aqueous solution of silver nitrate. The immersion is maintained for a period of 30 minutes at which time the powdered zeolite is removed from the solution, dried and heated to a temperature of 200° C. for a period of approximately 20 minutes. The temperature is then raised to 750° C. for 110 minutes to stabilize the catalytic structure. A layer of powdered zeolite is then spread on one surface of a hydrophilic cellophane film and pressed under dielectric heat. The structure thus formed possesses good catalytic properties when used in a fuel cell system on the oxidizing gas side, utilizing a 28% sodium hydroxide electrolyte and operating at a temperature range of from 60–100° C.

*Example 2*

The procedure described in Example 1 is repeated substituting a 25% solution of copper sulfate for the silver nitrate. Thus, the powdered zeolite contained copper ions in place of silver. The powder is used to coat a thin layer (3 mm. thickness) of polyurethane foam. The electrode possesses good catalytic properties when used as the oxidizing electrode in a fuel cell system, utilizing an 18% sodium hydroxide electrolyte and operating at temperatures in the range of 60–100° C.

In Examples 1 and 2, the zeolite can be activated with catalytic ions more suitable for use as the fuel electrode including nickel, palladium, platinum, rhodium and ruthenium. Employing the electrodes of the above examples, it is possible to maintain the activated zeolite in contact with the electrolyte, or the diffusion barrier can be in contact with the electrolyte and the activated zeolite facing the gas side. Example 1 preferably would be operated with the hydrophilic cellophane polymer in contact with the electrolyte and the gas passed through or on the activated zeolite side, with the ions being diffused through the hydrophilic barrier. Example 2 would preferably have the hydrophobic polyurethane foam fronting the gas and the activated zeolite in contact wtih the electrolyte.

*Example 3*

An electrode-electrolyte structure is formed by spray coating a retaining electrolyte matrix, which is a non-porous, non-conducting, absorbent asbestos paper, with the fine powdered zeolite of Example 1. The electrolyte is thus contained within a very fine porous asbestos paper matrix and the zeolite powder coating the matrix is held in place by means of a non-conducting, non-wettable gas distribution polyethylene layer. The electrode, when operated in a fuel cell, exhibited a high degree of electrochemical stability.

*Example 4*

Ninety-five parts of a zeolite having a pore size of about 3 angstroms and the formula $K_2O \cdot Al_2O_3 \cdot (SiO_2)_2$ is admixed in the presence of 20 parts water with 5 parts of bentonite, a ceramic binding agent. The admixture is shaped as a flat plate and dried at a temperature of 550° C. for a period of 1¾ hours in a vacuum oven. After firing, the potassium ions present in the structure are interchanged with nickel ions by immersing the structure in a nickel salt solution comprising 30 grams nickel chloride, 50 grams ammonium chloride, 100 grams sodium citrate, 10 grams sodium hypophosphite and sufficient water to bring the solution to 1000 grams. The pH of the solution is 8.5. The nickel salt solution is maintained at a temperature of 95–100° C. for a period of 15 minutes. The structure is removed from the bath and dried by passing a moderately heated inert gas (30–35° C.) over the plate. The activated structure thus obtained is heated at a temperature of 750° for 110 minutes for stabilization. The activated plate is coated with 38% water emulsion of a thin film of polyvinyl chloride. The film is allowed to cure at room temperature by standing over night. The process is repeated to apply a second and third layer of polymer. The electrode, when used in a fuel cell on the fuel gas side utilizing a 28% sodium hydroxide electrolyte and operated at a temperature in the range of 100–120° C., exhibited a high degree of electrochemical stability.

In Examples 1–4 activating metallic ions other than those set forth in the examples can be used to replace the naturally occurring ions in the zeolite. It is possible to employ any metallic ions which will displace the naturally occurring ions including copper, cobalt, magnesium, platinum, palladium, rhodium, iridium, and ruthenium. Additionally, in Examples 1–4 the polymer membrane can be replaced by any plastic polymeric material, such as polystyrene, tetrafluoro-ethylene polymers, polyvinylidene chloride, copolymers of vinyl chloride and polyvinylidene chloride, polyvinyl ethyl ether, polyvinyl alcohol, polyvinyl acetate, polyethylene, polypropylene cellulose, methyl methacrylate, polymethacrylate, butadiene-styrene copolymers, styrenated alkyd resins, polyepoxide resins, such as Epon 1001, 864, 828, etc., and chlorinated rubber. The proper selection is within the ability of one skilled in the art.

The illustrative examples are given as preferred embodiments of the invention, however, the invention is not to be construed as limited thereby. It is possible to produce still other embodiments without departing from the inventive concept herein described and such embodiments are within the ability of one skilled in the art.

The instant application is a continuation-in-part of my co-pending application, Serial No. 46,380, filed August 1, 1960, entitled "Catalysts and Electrodes for Fuel Cells."

What is claimed is:
1. An electrode for a fuel cell having a metal catalyst bonded therein, comprising a catalytic metal containing, heat stabilized, ion-exchanged zeolite bonded to a gas diffusion membrane, said heat stabilizing occurring at a temperature of from about 600–1600° C.
2. The electrode of claim 1 wherein the electrode is bi-porous.
3. The electrode of claim 1 wherein the gas diffusion membrane is a hydrophilic polymer layer.
4. The electrode of claim 1 wherein the gas diffusion membrane is a hydrophobic polymer layer.
5. The electrode of claim 1 wherein the gas diffusion membrane is a member of the group consisting of polystyrene, polyvinylchloride, vinylchloride and vinylidene chloride co-polymers, polyvinylethyl ether, polyvinylalcohol, polyvinylacetate, polyethylene, polypropylene, cellulose, polymethyl methacrylate, polymethacrylate, butadiene-styrene co-polymers, styrenated alkyd resins and polyepoxide resins.
6. An electrode for a fuel cell having a metal catalyst bonded therein, comprising a catalytic metal containing, heat stabilized, ion-exchanged zeolite bonded to a gas diffusion membrane, said electrode formation comprising ion-exchanging the naturally occurring ions of the zeolite with an activating metallic ion, heat stabilizing the ion-exchanged zeolite by heating in the temperature range of from 600–1600° C. and bonding said zeolite to said gas diffusion membrane.
7. The method of making a fuel cell electrode having a metal catalyst bonded therein comprising the steps of (1) forming an electrode structure from an admixture containing a zeolite, (2) ion-exchanging the naturally occurring ions from said zeolite with activating metallic ions, (3) heat stabilizing said zeolite by heating in the temperature range of from 600–1600° C. and (4) bonding said zeolite to a gas diffusion membrane.
8. The method of claim 7 wherein the metal catalyst is at least one metal ion selected from the group consisting of silver, copper, nickel, platinum, palladium, rhodium, ruthenium, cobalt, magnesium and iridium.

References Cited in the file of this patent
UNITED STATES PATENTS

| | | |
|---|---|---|
| 2,444,913 | Bond | July 13, 1948 |
| 2,525,818 | Mahan | Oct. 17, 1950 |
| 2,627,506 | Hunter et al. | Feb. 3, 1953 |
| 2,921,033 | Houdry | Jan. 12, 1960 |
| 2,947,797 | Justi et al. | Aug. 2, 1960 |